United States Patent
Serrano Garcia et al.

(10) Patent No.: US 10,531,325 B2
(45) Date of Patent: Jan. 7, 2020

(54) FIRST NETWORK NODE, METHOD THEREIN, COMPUTER PROGRAM AND COMPUTER-READABLE MEDIUM COMPRISING THE COMPUTER PROGRAM FOR DETERMINING WHETHER A PERFORMANCE OF A CELL IS DEGRADED OR NOT

(71) Applicant: Telefonaktiebolaget LM Ericsson (publ), Stockholm (SE)

(72) Inventors: Inmaculada Serrano Garcia, Campanillas (ES); Raquel Barco Moreno, Malaga (ES); Ana Gomez Andrades, Malaga (ES); Pablo Munoz Luengo, Malaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

(21) Appl. No.: 15/574,531

(22) PCT Filed: May 20, 2015

(86) PCT No.: PCT/EP2015/061176
§ 371 (c)(1),
(2) Date: Nov. 16, 2017

(87) PCT Pub. No.: WO2016/184520
PCT Pub. Date: Nov. 24, 2016

(65) Prior Publication Data
US 2018/0160327 A1    Jun. 7, 2018

(51) Int. Cl.
*H04W 24/10*     (2009.01)
*H04W 24/04*     (2009.01)
(Continued)

(52) U.S. Cl.
CPC ........... *H04W 24/10* (2013.01); *H04W 24/02* (2013.01); *H04W 24/04* (2013.01); *H04W 24/06* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 7,324,433 B1 * | 1/2008 | Hsu ...................... | H04W 28/18 370/208 |
| 2003/0104793 A1 * | 6/2003 | Iwasaki ............... | H04W 52/367 455/117 |

(Continued)

FOREIGN PATENT DOCUMENTS

| WO | 2013 148785 A1 | 10/2013 |
|---|---|---|
| WO | 2014 040633 A1 | 3/2014 |

OTHER PUBLICATIONS

An Automatic Detection and Diagnosis Framework for Mobile Communication Systems by Peter Szilagyi et al.; IEEE Transactions on Network and Service Management, vol. 9. No. 2—Jun. 2012.

(Continued)

*Primary Examiner* — Gregory B Sefcheck
*Assistant Examiner* — Joshua Smith
(74) *Attorney, Agent, or Firm* — Baker Botts, LLP

(57) ABSTRACT

A method performed by a first network node (110) for determining whether a performance of a cell (130) associated with a second network node (120) is degraded or not. The first network node (110) and the second network node (120) operate in a wireless communications network (100). The first network node (110) obtains (201) a first set of values making up a pattern comprising a set of values indicative of a performance of the cell (130). The first network node (110) then determines (204) a first correlation between the obtained first set of values and a generated set of values. The generated set of values is indicative of a degraded performance of the cell (130). The first network node (110) then determines (206) whether the performance of the cell (130) is degraded or not based on the determined first correlation, with respect to a first threshold.

17 Claims, 11 Drawing Sheets

(51) Int. Cl.
*H04W 24/02* (2009.01)
*H04W 24/06* (2009.01)
*H04W 24/08* (2009.01)

(56) References Cited

U.S. PATENT DOCUMENTS

2006/0193305 A1* 8/2006 Litwin .................. H04J 3/0605
370/350
2007/0287510 A1* 12/2007 G. Nader ............. H04W 24/10
455/574
2012/0224515 A1* 9/2012 Nakayama ........ H04W 56/0085
370/280

OTHER PUBLICATIONS

Correlation-Based Cell Degradation Detection for Operational Fault Detection in Cellular Wireless Base-Stations by Muhammad Zeeshan Asghar et al., Institute for Computer Sciences, Social Informatics and Telecommunications Engineering—2013.
Operational Fault Detection in Cellular Wireless Base-Stations by Sudarshan Rao; IEEE Transactions on Network and Service Management, vol. 3, No. 2, Second Quarter—2006.
International Search Report for International application No. PCT/EP2015/061176—Feb. 29, 2016.
Self-Healing Framework for LTE Networks by Muhammad Zeeshan Asghar et al.; 2012 IEEE International Workshop on Computer Aided Modeling and Design of Communication Links and Networks (CAMAD)—2012.
Statistical Algorithms in Fault Detection and Prediction: Toward a Healthier Network by Benjamin Cheung et al.; Bell Labs Technical Journal 9(4). 171-185—2005.

* cited by examiner

FIRST NETWORK NODE, METHOD THEREIN, COMPUTER PROGRAM AND COMPUTER-READABLE MEDIUM COMPRISING THE COMPUTER PROGRAM FOR DETERMINING WHETHER A PERFORMANCE OF A CELL IS DEGRADED OR NOT

PRIORITY

This nonprovisional application is a U.S. National Stage Filing under 35 U.S.C. § 371 of International Patent Application Serial No. PCT/EP2015/061176 filed May 20, 2015, and entitled "First Network Node, Method Therein, Computer Program and Computer-Readable Medium Comprising the Computer Program for Determining Whether a Performance of a Cell is Degraded or Not."

TECHNICAL FIELD

The present disclosure relates generally to a first network node, and a method therein for determining whether a performance of a cell associated with a second network node is degraded or not. The present disclosure relates as well to a computer program and a computer-readable storage medium, having stored thereon the computer program to carry out the aforementioned method.

BACKGROUND

Communication devices such as wireless devices are also known as, e.g., User Equipments (UE), mobile terminals, wireless terminals and/or mobile stations. Wireless devices are enabled to communicate wirelessly in a cellular communications network or wireless communication system, sometimes also referred to as a cellular radio system, wireless communications network, or cellular network. The communication may be performed, e.g., between two wireless devices, between a wireless device and a regular telephone, and/or between a wireless device and a server via a Radio Access Network (RAN) and possibly one or more core networks, comprised within the cellular communications network.

Wireless devices may further be referred to as mobile telephones, cellular telephones, laptops, tablets or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The wireless communications network covers a geographical area which is divided into cell areas, wherein each cell area being served by an access node such as a base station, e.g., a Radio Base Station (RBS), which sometimes may be referred to as, e.g., "Evolved Node B (eNB)", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

The increasing amount of network elements in the current deployments of cellular networks is leading to an enormous complexity of operation and maintenance. Mobile experts have to deal with thousands of performance indicators, counters, alarms and configuration parameters in order to detect and diagnose problems in their networks. The concept of Self-Healing is precisely to automate those tasks of troubleshooting, such as detection, diagnosis, compensation and recovery, with the aim of reducing capital and operational expenditures and making the network more reliable.

One of the key challenges in the context of Self-Healing is the automatic search of degraded cells. The objective is to support the non-intrusive fault detection mechanisms to improve availability and reliability of the networks. The importance of this problem lies not only in developing effective reactive methods for fault detection, but also in creating proactive mechanisms that allow to anticipate and avoid the occurrence of faults. In addition, the design of effective methods to detect degradations is crucial to reduce the number of false positives of the detection algorithms, commonly called "false alarms". Lastly, it is worth mentioning that the problem of cell degradation detection is of particular relevance in the context of heterogeneous mobile networks. For example, an outage of a Universal Mobile Telecommunications System (UMTS) cell can cause degradations on some performance indicators of an LTE cell. In this situation, it may be important to find the degradation of the LTE cell in order to aid the cell outage detection in the UMTS network.

The first mechanisms of cell degradation detection were based on monitoring metrics and establishing specific thresholds to detect if the current value of a certain metric exceeds or goes below a threshold value during a specific time. This approach is currently used in most of the existing self-healing tools and provides acceptable performance. However, the limitation of requiring human intervention to set the associated thresholds is a severe drawback. In addition, when the time evolution of metrics is analyzed, sometimes degradations are given by a peak whose values are within the normal range of the metric if the whole period is considered, i.e., the metric may be locally degraded but not globally. As a consequence, the metric may not violate the threshold and the degradation may not be detected. Furthermore, since the values of performance indicators largely depend on different factors, such as the traffic load, the type of network, etc., the thresholds may be different for different networks, complicating the procedure of threshold definition. For all these reasons, more complex approaches have been proposed in the literature. In [1], a couple of adaptive algorithms that require minimal human intervention are proposed. Unlike using fixed thresholds, the basis of these two solutions is to detect cell degradations by recognizing abnormal trends in the time evolution of the traffic data. For a certain desired level of confidence, determined by the operator, the algorithms find evidence of faults to meet such a level of confidence. Looking at their differences, the first algorithm includes a previous learning stage where a baseline profile is built by computing expected values of the metric over time. In the second alternative, instead of carrying out learning, the proposed algorithm estimates the data by looking at neighboring cells, assuming that there is an appreciable level of correlation between them. In both cases, the algorithms may adapt to variations in the network operation over time.

In [2], a method that calculates the correlation between two cells to detect degradations in cells is proposed. In that work, due to the lack of available degradations in observed real data, artificial errors in the real data were introduced. Such data are not generated by the method; they are only used for simulation purposes. The Pearson correlation coefficient between the observed cell and a neighbor cell is periodically calculated. When the metric in the observed cell starts to be degraded, due to the artificially introduced degradation, and the neighbor cell is healthy, the correlation coefficient falls below a pre-defined threshold, meaning that the degradation is detected. The choice of cells to make the comparison with the target cell is also discussed. In [3], a method for determining faults in a mobile network through pattern clustering is proposed. In particular, the fault indicators are assigned to a predetermined fault category. This category pattern is stored to form a fault category matrix. Then, all the generated matrices are clustered and the most relevant clusters are determined to identify recurrent fault category patterns and finally determine the network fault. In [4], a method for identifying the causes of changes in performance indicators by looking at the correlation with a plurality of counters is proposed. First, the candidate counters are grouped into clusters of similar counters. Then, one or more representative counters are selected from each cluster. With this method, the large problem space associated with numerous counters is effectively reduced. Finally, in [5], an integrated detection and diagnosis framework to identify anomalies and find the most probable cause of the problems is proposed. More specifically, this framework automatically generates profiles of performance indicators to characterize the faultless behavior of a network and, then, these profiles are used as reference patterns to identify significant deviations from the normal behavior.

However, the existing techniques for cell degradation detection are characterized by a poor performance, and/or are computationally complex. Therefore, with the existing techniques, operators may lose their confidence in using automated algorithms for cell degradation detection. The reason for this is that, as a consequence of the bad performance of the existing techniques, the ratio of false positives becomes high, resulting in distractions that, in some cases, require additional cost for operators.

SUMMARY

The embodiments disclosed herein provide a way of improving the performance in a wireless communications network by improving the current techniques of cell degradation detection.

According to a first aspect of embodiments herein, this is achieved by a method performed by a first network node. The method is for determining whether a performance of a cell associated with a second network node is degraded or not. The first network node and the second network node operate in a wireless communications network. The first network node obtains a first set of values indicative of a performance of the cell. The first network node then determines a first correlation between the obtained first set of values and a generated set of values. The generated set of values make up a pattern comprising a set of values indicative of a degraded performance of the cell. The first network node then determines whether the performance of the cell is degraded or not based on the determined first correlation, with respect to a first threshold.

According to a second aspect of embodiments herein, this is achieved by the first network node. The first network node is configured to determine whether the performance of the cell associated with the second network node is degraded or not. The first network node and the second network node are configured to operate in the wireless communications network. The first network node is further configured to obtain the first set of values indicative of the performance of the cell. The first network node is also configured to determine the first correlation between the obtained first set of values and the generated set of values. The generated set of values make up the pattern comprising the set of values indicative of a degraded performance of the cell. The first network node is further configured to determine whether the performance of the cell is degraded or not based on the determined first correlation, with respect to the first threshold.

According to a third aspect of embodiments herein, this is achieved by a computer program, comprising instructions which, when executed on at least one processor, cause the at least one processor to carry out the method performed by the first network node.

According to a fourth aspect of embodiments herein, this achieved by a computer-readable storage medium, having stored thereon the computer program, comprising instructions which, when executed on at least one processor, cause the at least one processor to carry out the method performed by the first network node.

By determining whether the performance of the cell is degraded or not based on the determined first correlation between the obtained first set of values and the generated set of values, wherein the generated set of values make up a pattern comprising a set of values indicative of a degraded performance of the cell, the first network node is capable of detecting the degraded performance of the cell more effectively, with a reduced ratio of false positives.

Furthermore, by detecting similarities between sequences, instead of searching for dissimilarities, the first network node detects the degraded performance of the cell with higher robustness. This is because the correlation coefficient is more appropriate to detect similar patterns than to detect different trends.

Moreover, the first network node is capable of detecting the degraded performance of the cell with a method of lower computational complexity than that of existing methods.

Additional advantages of embodiments herein will be discussed later.

BRIEF DESCRIPTION OF THE DRAWINGS

Examples of embodiments herein are described in more detail with reference to the attached drawings in which.

DETAILED DESCRIPTION

Figure 1:
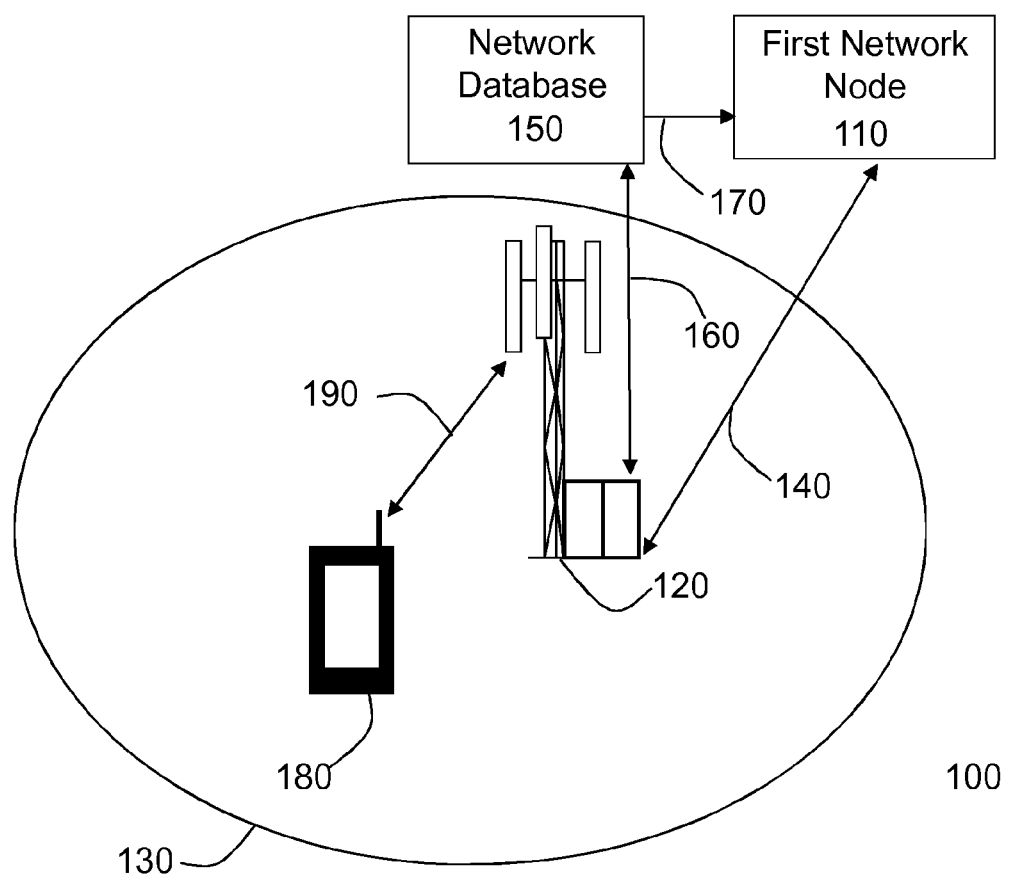
FIG. 1 is a schematic block diagram illustrating embodiments in a wireless communications network, according to embodiments herein.

As part of the development of the embodiments disclosed herein, problems associated with existing methods will first be identified and discussed.

While the first mechanisms of cell degradation detection, based on specific thresholds, have obvious limitations, the latest methods such as the use of correlation coefficients also present some disadvantages. A common approach is to search for dissimilarities in a specific metric between past time intervals and the current time interval in order to detect anomalies [1]. However, the variability in the time domain of some metrics may result in degraded correlation values that would hinder the detection of faulty patterns. For example, counters such as those related to the number of established connections whose number of occurrences per unit time is high, >1000, are quite stable in time. However, other kind of metrics, such as the number of dropped calls whose number of occurrences is very low, ~10, may result in high temporal variance. In these cases, there is a clear uncertainty when the existing methods have to decide whether any behavior is anomalous or not. Identifying a pattern in a sampled metric may provide benefits with respect to simpler analysis techniques such as e.g. by applying thresholds based on an average and/or a variance of the sampled metric. The variability of metrics may sometimes lead to spurious peaks in respect to values collected for some of these metrics that are not representing degradations. However, simpler techniques in existing methods, e.g., based on applying threshold values for metrics based on e.g., average values, rather than methods described herein, related to applying correlation between a set of collected metric values in respect to degraded patterns, may—unfortunately—wrongly consider them as a degraded behavior. If a faultless pattern is incorrectly identified as degraded, it may involve unnecessary time-consuming tasks for troubleshooting experts. Similarly, if a degraded pattern is not detected, the persistence of the potentially associated fault may significantly degrade the performance of the network.

Another existing alternative is to compare the behavior of a metric in a cell with the same metric measured in other cells, assuming that there exists correlation between them [1,2]. However, as stated in [2], only 5% of cell pairs that are close in space show high correlation. In addition, cells that are far away from the cell under analysis are not suitable for selection since the local variations, e.g., due to traffic, may not be the same. For these reasons, this approach has severe limitations for cell degradation detection. [3-4] are related to correlation analyses but in the diagnosis part of the Self-Healing paradigm, which is the next stage following the detection stage. Finally, in [5], the detection is made by identifying deviations from the normal behavior, but no specific patterns in the metric's behavior can be identified.

In addition to correlation-based approaches, predictive systems may also be considered a reasonable approach to face the problem of cell degradation detection, as fault prediction is closely related to degradation detection. However, these solutions are typically complex and require high computational cost and learning.

As a consequence of the bad performance of the existing techniques, the ratio of false positives becomes high, resulting in distractions that, in some cases, require additional cost for operators.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

FIG. 1 depicts a particular example of a wireless communications network 100, sometimes also referred to as a cellular radio system, cellular network, mobile network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access, Universal Terrestrial Radio Access (UTRA) TDD, GSM network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system, system operating in mmW bands or any cellular network or system.

The wireless communications network 100 comprises a first network node 110. The first network node 110 may be, for example, a core network node such as a Management System network node 110. The Management System network node may be any network node that has access to the network performance metrics such as counters, key performance indicators, alarms, call traces, etc. . . . , i.e., a node responsible of the network management, which, as it may be apparent to the skilled person in view of the prior art, may be further configured—in view of the data it may receive, and its internal logic—to take further actions in respect to configuration parameters governing the operation of one or more cells, i.e., said further actions addressing to diminish and/or avoid the adverse effects caused by a cell which performance may be determined as degraded. The first network node 110 may also be any node, internal or external, that has access to the network performance metrics. In some particular embodiments, the first network node 110 is an Operational Support System (OSS) node.

The wireless communications network 100 comprises a second network node 120. The second network node 120 may be, for example, a base station such as e.g., an eNB, eNodeB, or a Home Node B, a Home eNode B, femto Base Station, BS, pico BS, a macro eNodeB, access node or any other network unit capable to serve a wireless device or a machine type communication device in the wireless communications network 100. In some particular embodiments, the second network node 120 may be a stationary relay node or a mobile relay node. The wireless communications network 100 covers a geographical area which is divided into cell areas, wherein each cell area is served by a network node, although, one network node may serve one or several cells, and one cell can be served by one or several network nodes. In the non-limiting example depicted in FIG. 1, the second network node 120 serves a radio cell 130. The second network node 120 may be of different types, based on transmission power and thereby also cell size. For example, a pico base station has low transmission power and a macro eNodeB has high transmission power. Typically, wireless communications network 100 may comprise more cells similar to the radio cell 130, served by their respective radio network node. This is not depicted in FIG. 1 for the sake of simplicity. The second network node 120 may support one or several communication technologies, and its name may depend on the technology and terminology used. In 3GPP LTE, the second network node 120 is directly connected through a first link 140 to one or more core networks, of which only the first network node 110 is depicted in FIG. 1. In some particular embodiments, a network database 150 may be comprised in the wireless communications network 100. The network database 150 may store the performance metrics of the wireless communications network 100, such as the counters, key performance indicators, alarms, call traces, etc. . . . of the second network node 120. In some embodiments, the network database 150 may be connected to the second network node 120 through a second link 160, and to the first network node 110 through a third link 170. The network database 150 may be an OSS database.

The wireless communications network 100 may also comprise a wireless device 180. The wireless device 180 operates in the wireless communications network 100. The wireless device 180 is a wireless communication device or radio communication device such as a UE, which is also known as e.g., mobile terminal, wireless terminal, mobile station, mobile telephone, cellular telephone, smart phone, and/or target device. Further examples of different wireless devices include laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, Machine-to-Machine (M2M) capable devices or UEs, device to device (D2D) UE or wireless devices, devices equipped with a wireless interface, such as a printer or a file storage device, Machine Type Communication (MTC) devices such as sensors, e.g., a sensor equipped with UE, just to mention some examples.

The wireless device 180 is enabled to communicate, e.g., voice and/or data, wirelessly in the wireless communications network 100. The communication may be performed e.g., between two devices, between a device and a regular telephone and/or between a device and another entity, such as a server or any other radio network unit capable of communicating over a radio link in the wireless communications network 100. The communication may be performed e.g., via a Radio Access Network.

The wireless device 180 is located within the radio cell 130. The wireless device 180 is configured to communicate with the second network node 120 over a radio link 190.

As an overview, embodiments are provided herein of a method performed by the first network node 110 to detect degradations in cell metrics. A metric may be a performance indicator, a counter, an alarm, etc. To overcome the main drawbacks of the existing approaches, the embodiments herein may compare a potential degradation in a metric with a template or pattern that represents a hypothetical degraded behaviour by using one or more correlations. If they are sufficiently correlated, then the corresponding degradation may be detected. Unlike [2], the embodiments herein do not attempt to find dissimilarities between a degraded cell and a healthy cell, but to find similarities between a real degraded pattern and a fictitious degraded pattern. The reason for this is that the correlation coefficient is more appropriate to detect similar patterns than to detect different trends. In particular, the algorithm may compare a sequence of samples of the observed metric with a pre-generated degraded pattern by using a simple correlation indicator, e.g. the Pearson correlation coefficient.

Embodiments of a method performed by the first network node 110 for determining whether a performance of the cell 130 associated with the second network node 120 is degraded or not, will now be described with reference to the flowchart depicted in FIG. 2. The first network node 110 and the second network node 120 operate in the wireless communications network 100.

Figure 2:
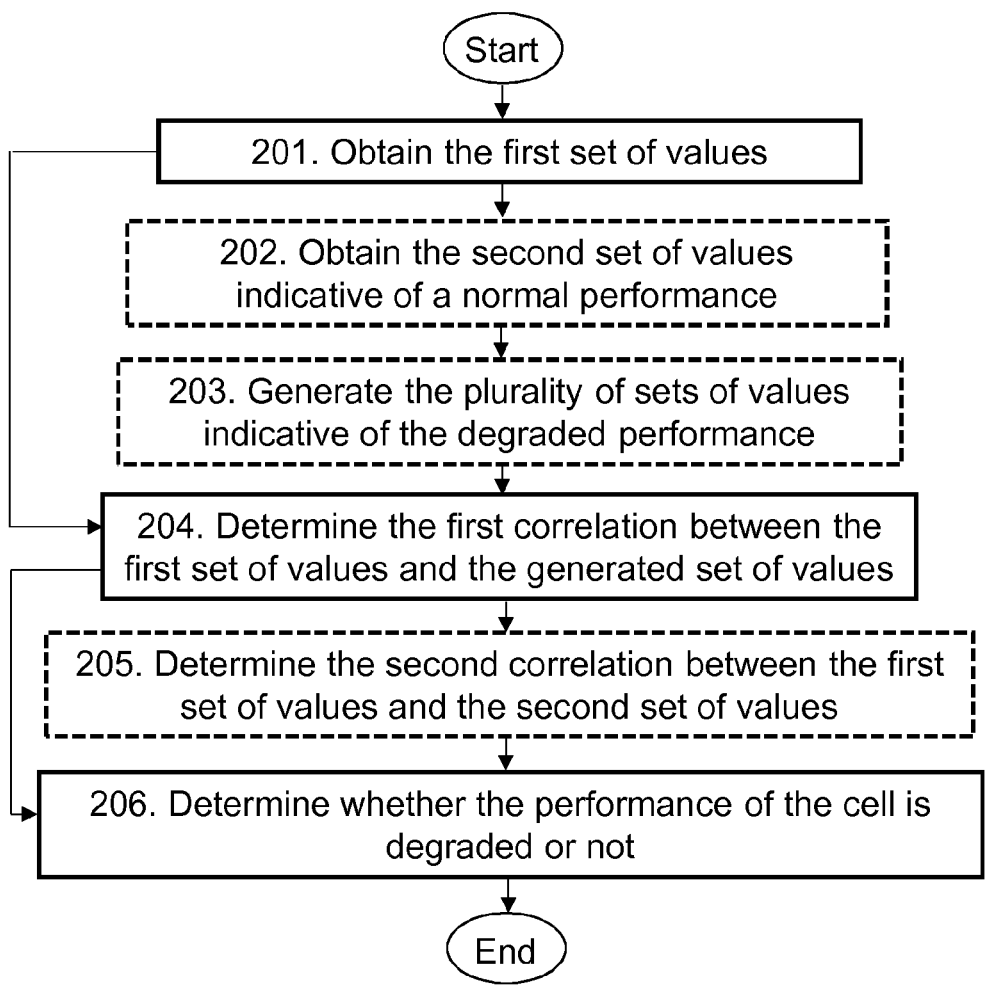
FIG. 2 is a schematic diagram depicting embodiments of a method in a first network node, according to embodiments herein.

FIG. 2 depicts a flowchart of the one or more actions that are or may be performed by the first network node 110 in embodiments herein. In FIG. 2, a box with dashed lines indicates that the action is optional. The sequence of the actions in FIG. 2 will be described first. Some of the Actions in FIG. 2, and some of the features involved will be explained in further detail later, in relation to subsequent figures.

The method for determining may comprise the following actions, which actions may as well be carried out in another suitable order than that described below. In some embodiments, all the actions may be carried out, whereas in other embodiments only some action/s may be carried out.

Action 201

In order to be able to assess if the cell 130 is degraded or not, in this action, the first network node 110 obtains a first set of values indicative of the performance of the cell 130.

The first set of values may be temporal sequences of data related to the performance of the cell. That is, the first set of values may be a sequence of samples of a metric, e.g., counters, performance indicators, traces, etc. . . . that comprises information related to the cell 130. Performance of the cell is understood to relate to e.g. the radio quality of the cell 130.

The first set of values indicative of the performance of the cell 130 may be an observed sequence of X·Y time duration, being Y the time period for one measurement, e.g. 1 hour, and X the number of time periods, e.g. 24, corresponding to X·Y hours of collected samples, e.g. 24 hours.

The reason for choosing 24 hours as a typical value is due to the periodicity, normally 24 hours, of most metrics in cellular networks, as a consequence of the offered traffic. However, the parameters X and Y may be configured with any positive integer value.

Each sample may be generated at each time period, e.g. one hour, and may be stored in an external database or a network element such as the network database 150, e.g. the Operational Support System (OSS) of the network.

Thus, in some embodiments, the first network node 110 may obtain the first set of values by retrieving them from the network database 150.

Action 202

In some embodiments, the first network node 110 may also consider, for the analysis of the potential degradation of the cell 130, a second set of values which may be used as a reference set of values for being indicative of a non-degraded performance of the cell 130.

In these embodiments, the first network node 110 may obtain a second set of values indicative of the non-degraded performance of the cell 130.

The second set of values indicative of the non-degraded performance of the cell 130 may be a reference sequence of the same duration as the first set of values, that is X·Y hours, corresponding to the same hours in a different day.

Thus, in some embodiments, the first input signal for the method performed by the first network node 110 may be a vector comprising two parts: a) the first set of values indicative of the performance of the cell 130 that is to be evaluated for possible degradation, and b) the second set of values indicative of a non-degraded performance of the cell 130, which may be used as a reference, as described further below.

As the first set of values, the second set of values may be stored in an external database or a network element such as the network database 150.

Thus, in some embodiments, the first network node 110 may obtain the second set of values by retrieving them from the network database 150.

The algorithm performed by the first network node 110 may therefore be used in two different modes, depending on how the input signal is selected. That is, in some embodiments, the first set of values and the second set of values may be obtained in an operation mode out of: the offline mode and the online mode.

In the online mode, the first set of values may correspond to the more recently collected samples, while the second set of values may include samples from a past day, e.g., the day immediately before the observed day. Hence, the vector may comprise information corresponding to the last 2·X·Y hours, e.g. two days, of time. However, the periodicity between consecutive days may not always be evident, such as from Friday to Saturday or from Sunday to Monday. In such cases, the second set of values may correspond to the same hours of the first set of values, but one week before.

In the offline mode, the algorithm may be used to find degradations in historical data, so that the first set of values may not contain recent samples.

According to the above, a time period may be defined as a recent time period. In the online mode, the first set of values and the second set of values may be obtained within the recent time period, whereas in the offline mode, the first set of values and the second set of values may be obtained prior to the recent time period.

Action 203

In order to assess if the performance of the cell 130 is degraded or not, the first network node 110 may compare the performance of the cell 130 with one or more typical performance patterns that enable to identify most of the existing degradations in the cell 130. For this purpose, the first network node 130 may itself generate a set of values, the generated set of values making up a pattern comprising a set of values being indicative of a degraded performance of the cell 130.

The generated set of values indicative of a degraded performance of the cell 130 may be based on measured values and synthetic values. In other words, the generated set of values, also referred to herein as degraded pattern, may be a hybrid template composed of both real and synthetic sequences of data. The real data may be chosen from a past time interval of the metric, while the synthetic data may model a specific trend, e.g., an impulse, a step, a ramp, etc. . . . The synthetic data are described later in relation to the example of FIGS. 5-9. The combination of these two sequences of data may be used to produce the degraded pattern. The first network node 110 may therefore combine historical data with synthetic patterns in order to find degradations in real data.

In some embodiments, the first network node 110 may generate a plurality of sets of values, each of the plurality of generated sets of values making up a pattern comprising a set of values indicative of a degraded performance of the cell 130. This action may also be referred to herein as the generation of degraded patterns, and it is described in detail later, in relation to FIGS. 5-9. As will be explained later, the plurality of sets of values may correspond to multiple time shifts, i.e., delays, of the synthetic pattern to emulate earlier or later degradations.

Action 204

To compare the performance of the cell 130 with typical performance patterns that enable to identify most of the existing degradations in the cell 130 in order to be able to determine if the cell 130 is degraded or not, in this action, the first network node 110 determines a first correlation between the obtained first set of values and the generated set of values, the generated set of values making up the pattern comprising the set of values being indicative of a degraded performance of the cell 130. This action may also be referred to herein as the computation of the correlation indicator, and it is described further later, in relation to FIG. 10.

To compare two sequences of data, any correlation indicator from the literature may be utilized. For example, if the Pearson correlation coefficient is used, the obtained value is always between −1 and +1. The closeness to +1 means higher direct linear relationship, while the closeness to— means higher inverse linear relationship. In general, the greater the absolute value of the indicator, the higher the correlation between both sequences. In one example provided herein, only the magnitude of the Pearson coefficient is used, i.e. the sign is removed after its calculation.

The result of the first correlation may be referred to herein as r1. If there exists a generated set of values, that is a degraded pattern, among the available patterns, similar to the obtained first set of values, that is, the observed sequence, then the term r1 may indicate its existence through a high value. Thus, a high value of r1 may show that the obtained first set of values is likely to be degraded.

In some embodiments, the determining of the first correlation comprises determining a set of first correlations, the first correlation being one of the set of first correlations. Each of the first correlations is a correlation between the obtained first set of values and each of the generated sets of values of the plurality of generated sets of values indicative of a degraded performance of the cell 130, which as explained before correspond to different starting points of the degraded performance.

Action 205

In this action, the first network node 110 may determine a second correlation between the obtained first set of values and the obtained second set of values. The determination may be done by similar methods as those employed to determine the first correlation. That is, the Pearson correlation coefficient may be used to determine the second correlation.

The result of the second correlation may be referred to herein as r2. The term r2 may aim to measure the intrinsic similarity between the observed and the reference sequences of the given metric. For example, the daily traffic pattern may affect the temporal behavior of metrics. Such a factor may lead both sequences to be correlated. Under this situation, the expected value of r2 may be relatively high regardless of whether the observed sequence is degraded or not.

Action 206

The last part of the algorithm performed by the first network node 110 may comprise producing an output value that indicates whether the metric is degraded or not. To that effect, in this action, the first network node 110 determines whether the performance of the cell 130 is degraded or not based on the determined first correlation, with respect to a first threshold. This action may also be referred to herein as the Decision.

The first threshold may be a pre-defined threshold.

In some embodiments, the determining whether the performance of the cell 130 is degraded or not is further based on the determined second correlation, with respect to the first threshold. This will be explained in further detail in relation to FIG. 3.

In case degradation is detected, the information about the degraded pattern that matches the obtained first set of values may be part of the output of the method, together with the decision, degraded or not degraded.

In some embodiments, wherein the determining of the first correlation comprises determining the set of first correlations, each of the first correlations being a correlation between the obtained first set of values and each generated sets of values of the plurality of generated sets of values indicative of a degraded performance of the cell 130, the set of first correlations comprising the first correlation, the determining of whether the performance of the cell 130 is degraded or not is further based on the determined set of first correlations and the determined second correlation. This will be explained in further detail in relation to FIGS. 8-10 and in the examples described in relation to FIGS. 12-15.

In these embodiments, the first network node 110 may avoid the direct comparison of the correlation indicator value of any of the first correlation and the second correlation with the first threshold, since the variability of the metric may affect the magnitude of the correlation indicator. Instead, some intermediate operations and a variable threshold that may depend on the correlation level may be implemented to overcome this issue, as explained below.

In some particular embodiments, the determining whether the performance of the cell 130 is degraded or not is based on a difference between the determined first correlation and the determined second correlation with respect to the first threshold.

The first step may be to calculate d as the difference between r1 and r2, i.e., r1-r2. The obtained value, d, may be the proportion of the correlation due to the impact of a potential degradation in the obtained first set of values, removing other factors that may influence the behavior of the metric, e.g., the traffic fluctuations along the day. However, depending on the variability of the metric, the same degradation pattern may lead to different magnitudes of d. In particular, there are two sources of randomness that may determine such variability.

The first source may be the number of samples that are statistically significant. Unfortunately, not all the metrics collect the same amount of events at one measurement period. For example, the number of dropped calls may be much lower than the number of established connections. This may affect the variance of a metric in every measurement period. In other words, the samples collected at a certain time, e.g., at 2:00 pm, in the obtained first set of values and the obtained second set of values may be very different due to a lack of the statistical significance.

The second source may be the impact of context factors on the temporal behavior of the metric. There may be context factors such as the traffic fluctuations along the day that lead the obtained first set of values and the obtained second set of values to be partially correlated. It is clear that depending on the impact level and the characterization of the context factors, the correlation between the obtained first set of values and the obtained second set of values may be very different.

Taking into account these sources of randomness, the magnitude of d in presence of degradation may be higher as the randomness of the metric is greater. For example, in a first scenario, it may be first considered that the metric may be very predictable, leading to a high correlation between the obtained first set of values and the obtained second set of values, thus, high values of r1 and r2 may be obtained. In addition, it may be assumed that there is a degraded pattern that is very similar to the obtained first set of values. For such a degraded pattern, r1 and r2 may be, for example, equal to 97 and 92%, respectively. As a consequence, d=5%. In a second example scenario, it may be considered that the metric is less predictable, so that r1 and r2 are low. Assuming that the same degradation is present, for such a degraded pattern, r1 and r2 may be, for example, equal to 71 and 35%, respectively. This high value of r with respect to r2 now is because any clue of correlated behavior will significantly increase the correlation indicator. Consequently, the value of d is 36%. As observed, in this case, the impact of the degradation given by the value of d is significantly greater than the previous case.

Figure 3:
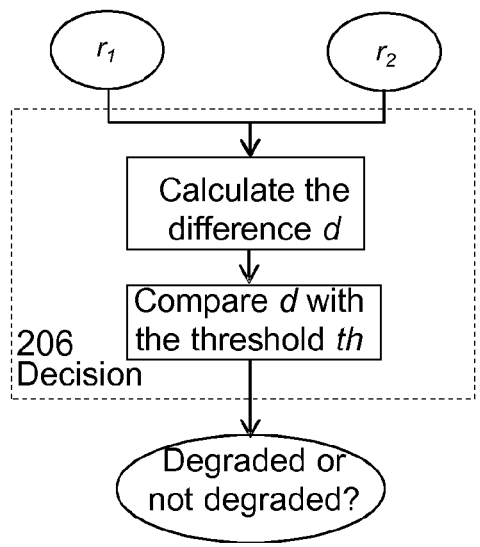
FIG. 3 is a schematic diagram depicting embodiments of a method in a first network node, according to embodiments herein.
Figure 4:
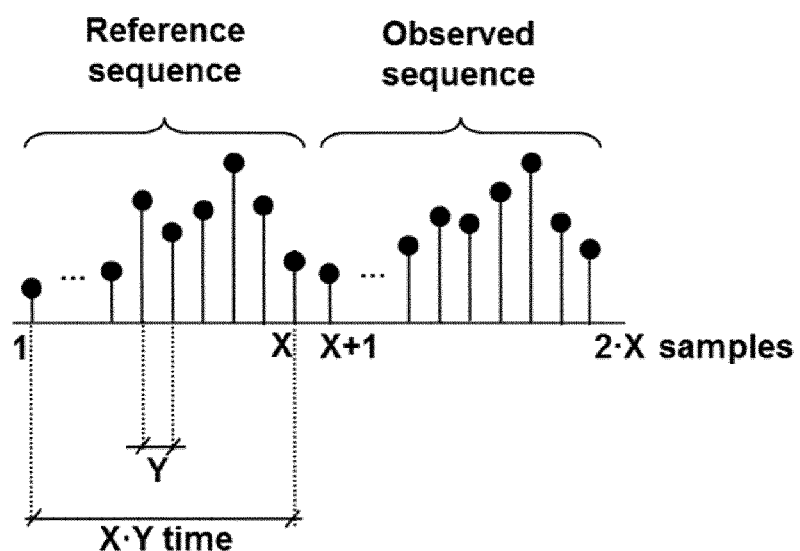
FIG. 4 is a schematic diagram depicting observed and reference sequences, according to embodiments herein.

To overcome this issue, the decision process may be implemented as shown by the flowchart of FIG. 3. FIG. 4 is a schematic block diagram illustrating the decision process for the embodiments wherein two different values of the correlation indicator for each plurality of sets of values may be computed by the first network node 110. In some embodiments, d may be compared with the first threshold, wherein the first threshold is a variable threshold, th, that depends on the magnitude of the correlation indicator when evaluated between the obtained first set of values and the obtained second set of values (r2). In particular, th may be defined as $(100-r2)/q$, where r2 may be expressed in percentage and q is a parameter that establishes the sensitivity to detect weak degradations. The range of q may be defined between $[1,+\text{Inf})$ and the recommended values of q may be between 1 and 3. In one example provided herein, q is equal to 3. A lower value means that only strong degradations may be detected. In the "proof of concept" section described later, some examples are covered to show the impact of this first threshold definition. Finally, it is highlighted that, in case degradation is detected, the information about the degraded pattern that matches the obtained first set of values may be part of the output of the method, together with the decision, degraded or not degraded.

FIG. 4 is a schematic diagram illustrating an example of the obtained first and second sets of values, also referred to herein as observed sequence and reference sequence, respectively. Each vertical bar topped by a dark circle represents a sample of a metric, that is, a value of a sampled metric indicative of the performance of the cell 130 at a time period Y out of X·Y time periods. The obtained first set of values have been obtained for the same duration, X·Y hours, as the obtained second set of values. Thus, as indicated FIG. 3, if the second set of values comprises X samples, the first set of values comprises 2·X samples.

Generation of Degraded Patterns

Figure 5:
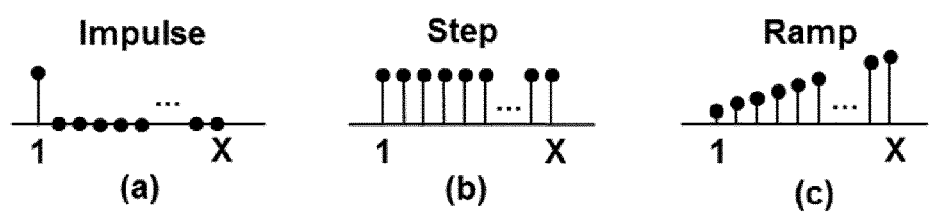
FIG. 5 is a schematic diagram depicting embodiments of synthetic patterns for cell degradation detection: (a) impulse, (b) step and (c) ramp, according to embodiments herein.

To detect cell degradations, some sets of values may be defined that make up typical patterns that enable to identify most of the existing degradations in the cell 130. Each of these sets of values may be referred to herein as the first synthetic set of values, or synthetic pattern or pattern. FIG. 5 shows some examples of these synthetic patterns, where the first sample, i.e., sample, corresponds to the beginning of the degradation. The first synthetic set of values in FIG. 5(a) refers to a short degradation that typically affects only one sample. This type of degradation is modeled by an impulse in the time domain. The first synthetic set of values in the example of FIG. 5 (b) represents a change in a parameter that produces a time-constant degradation in a certain metric. This kind of degradation may be modeled by a step in the time evolution of the metric, that is, a constant value in the first synthetic set of values. The first synthetic set of values in FIG. 5 (c) involves degradations that are gradually changing on time, e.g., increasing or decreasing, e.g. progressive CPU overload due to a fault in the software. This anomalous pattern follows a ramp-shaped model. As shown, each pattern may be a vector that contains X samples, e.g. 24, equivalent to one-day data of the metric.

Figure 6:
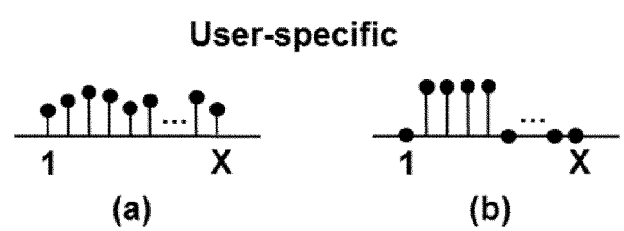
FIG. 6 is a schematic diagram depicting an example of user-specific synthetic patterns for cell degradation detection, according to embodiments herein.

In addition to the standard degradations, a user may introduce its own synthetic patterns representing particular degraded behaviors. For example, in FIG. 6, two hypothetic synthetic patterns are depicted, each corresponding to an example of the first synthetic set of values. Also as shown in FIG. 6, each pattern may be a vector that contains X samples, e.g. 24, equivalent to one-day data of the metric.

All the patterns described thus far only define the shape, i.e., the waveform, of the degradation, while the amplitude of its samples may be determined in a later action.

Figure 7:
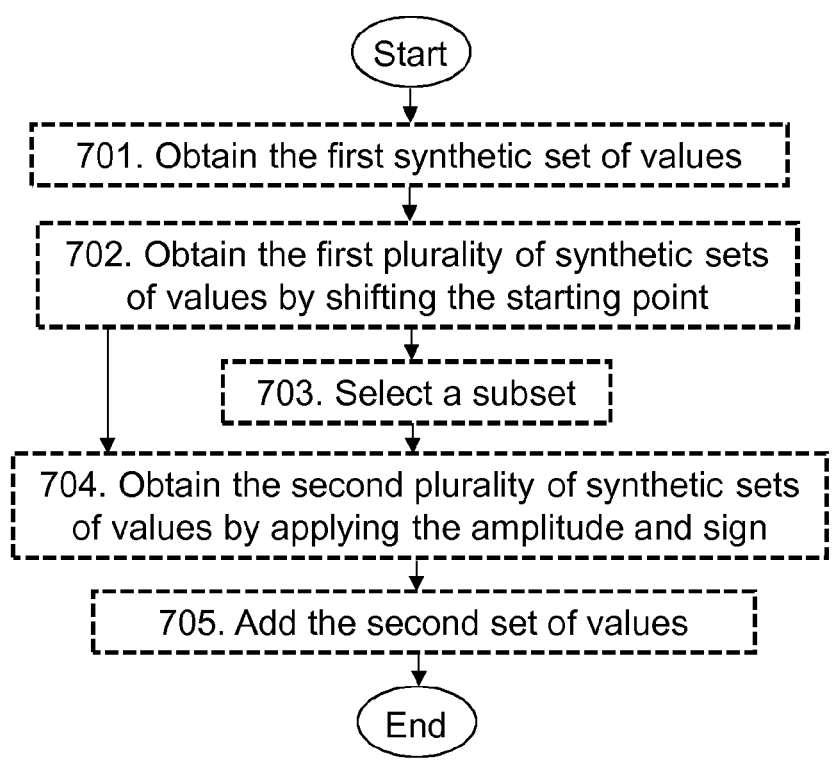
FIG. 7 is a schematic diagram depicting embodiments of a method in a first network node, according to embodiments herein.

The "Generation of degraded patterns" of Action 203 may comprise the process to build a hybrid template composed of both real and fictional sequences of data. The starting point of the generation of degraded patterns is the first synthetic set of values, and the ending point is the plurality of sets of values indicative of the degraded performance of the cell 130, which is used in Action 204. The real data are the input of metric data, i.e. as measured, while the fictional data are the input of synthetic patterns, as described in relation to FIGS. 5 and 6. The generation of degraded patterns, that is, Action 203, may comprise one or more actions, as shown in FIG. 7.

Action 701

As a first action for generating the plurality of sets of values indicative of the degraded performance of the cell 130, the first network node 110 may obtain the first synthetic set of values making up the pattern comprising a synthetic set of values indicative of a degraded performance of the cell 130. The first synthetic set of values may be any of the synthetic patterns described in relation to FIGS. 5 and 6.

In some embodiments, the first network node 110 may obtain the first synthetic set of values by retrieving them from the network database 150.

In some embodiments, the first network node may obtain several first synthetic sets of values, e.g., those of FIG. 5(a), FIG. 5(b) and FIG. 5(c), in which case, the actions of FIG. 7 may be repeated for each of the first synthetic set of values obtained.

Action 702

To detect the degradation, multiple time shifts, i.e., delays, of the first synthetic set of values may be potential templates that may be used in Action 204 to calculate a correlation coefficient, the first correlation. This is because the degradation may start at any time within the observed time window. In the case of using the method in the 'online' mode, as opposed to analyzing historical data, i.e. 'offline' mode, the observed time window may include the more recently collected samples. Thus, the first network node 100 may attempt to find degradations as soon as they happen.

Thus, in this Action 702, the first synthetic set of values may be shifted in time to emulate earlier or later degradations. The first network node 110 may therefore obtain a first plurality of synthetic sets of values by shifting a starting point of the first synthetic set of values indicative of a degraded performance of the cell 130 in each synthetic set of values of the first plurality of synthetic sets of values. In other words, for each first synthetic set of values, each making up a pattern, i.e., impulse, step, ramp and user-specific patterns, a first plurality of synthetic sets of values, that is, a set of shifted synthetic patterns, is generated. This procedure is further described later, in relation to FIG. 9.

Action 703

The first plurality of synthetic sets of values may be shortened depending on whether the online or the offline mode is used. For example, in the online mode, only larger shifts of the original patterns, with respect to the horizontal axis, as will be shown in FIG. 9(d), may be useful in order to detect recent degradations. By larger shifts of the original patterns it is meant that the starting point of the degraded pattern is closer to the current time, in agreement with the fact that in the online approach the idea is to find degraded behavior as soon as possible. In the offline mode, other kind of synthetic patterns, such as the one represented in FIG. 9(b) may also be appropriate to detect past degradations. Hence, the method includes a stage where some patterns may be discarded depending on the operation mode.

Accordingly, the first network node 110 may select a subset of the first plurality of synthetic sets of values based on the operation mode of the first network node 110, the operation mode being one of online and offline.

Action 704

The next Action of the "Generation of degraded patterns" is the calculation of an amplitude and sign of the first plurality of synthetic sets of values. These two elements depend on the metric under analysis and may be applicable to all the synthetic patterns. On the one hand, the amplitude may be defined as $k \cdot \sigma$, where k is a pre-defined parameter and $\sigma$ is the standard deviation of the reference sequence. The role of k is to provide an appropriate magnitude of the degradation with respect to the normal range of the input metric. The permitted range of values for k may be: $k \in (0, +\infty)$. However, the range of reasonable values for k may be typically between 1 and 4. The value of k may depend on the specific metric under analysis. On the other hand, the sign of the synthetic patterns may also be related to the given metric. In some metrics, the degradation comprises a decrease in the amplitude of the values. Other metrics may be degraded by an increase in the values. Finally, other kind of metrics may suffer degradation both above and below the normal range. Thus, depending on the metric, the sign may be positive, negative or both. In the latter case, the number of synthetic patterns may be duplicated, resulting in one set of synthetic patterns for increasing trends and other set for decreasing trends.

Thus, in this Action, the first network node 110 may obtain a second plurality of synthetic sets of values by applying the amplitude and sign to each of the first plurality of synthetic sets of values.

In the embodiments wherein Action 703 has been performed, the second plurality of synthetic sets of values is obtained by applying the amplitude and sign to each synthetic set of values of the subset of the first plurality of synthetic sets of value.

Action 705

Once the amplitude and sign are applied to the first plurality of synthetic sets of values, that is, to the shifted synthetic patterns, forming the second plurality of synthetic sets of values, the final degraded patterns are generated by adding the second plurality of synthetic sets of values to the second set of values obtained in Action 202.

Thus, in this Action, the first network node 110 may add the second set of values to each synthetic set of values of the second plurality of synthetic sets of values to obtain the plurality of sets of values.

In some embodiments, applying the amplitude and sign comprises truncating any values in the second plurality of synthetic sets of values exceeding a second threshold.

If any of the obtained values in the degraded pattern exceeds the allowed range of the metric, then such a value may be truncated by the corresponding limit of the metric. For example, the metric number of active connections may not have values below zero. Thus, if the degraded pattern achieves negative values, the involved samples may be truncated by zero, zero being the second threshold. The second threshold may therefore be set depending on the metric being sampled.

Figure 8:
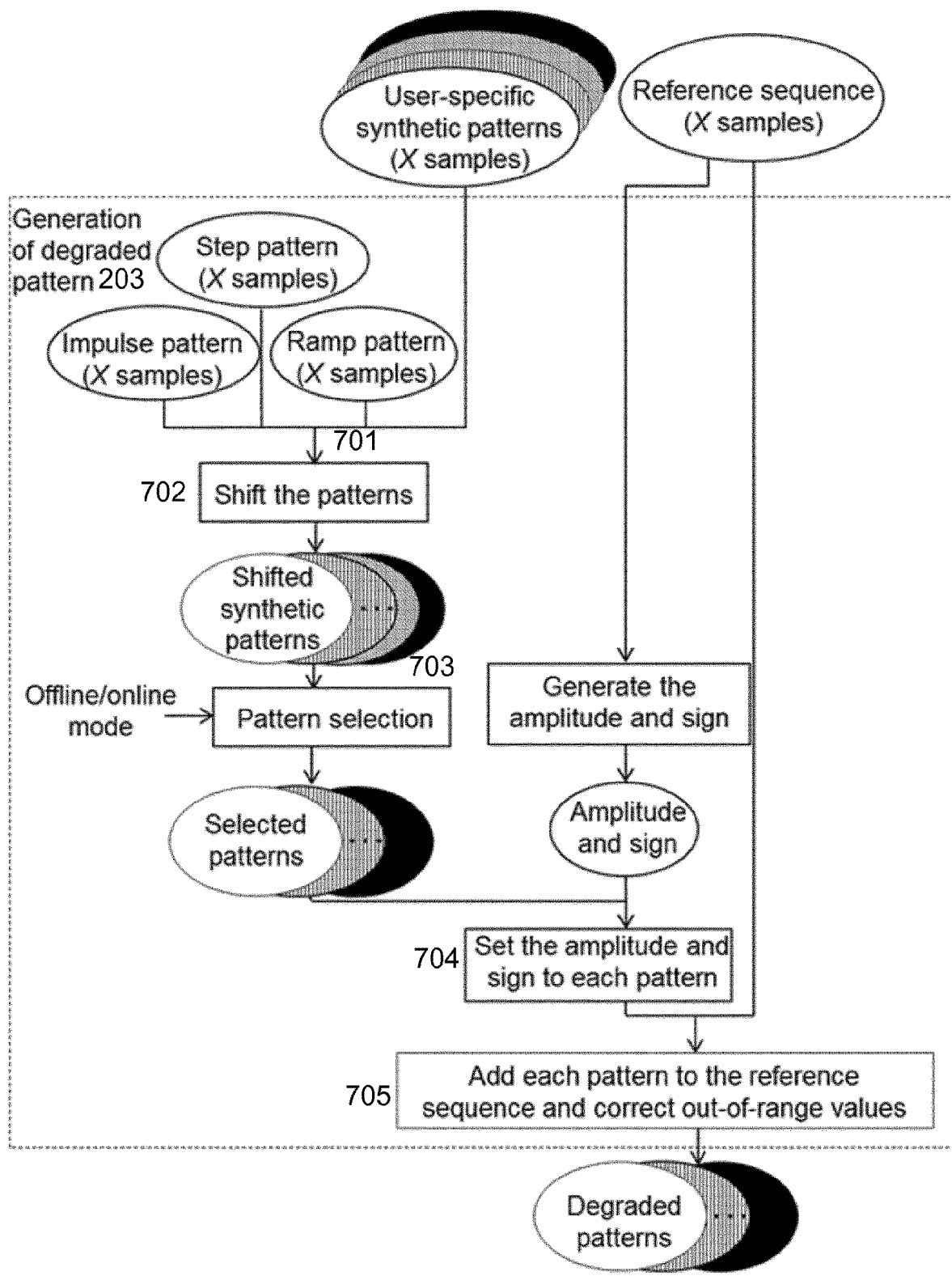
FIG. 8 is a flowchart depicting embodiments of a method in a first network node, according to embodiments herein for the generation of degraded patterns.

To summarize, FIG. 8 depicts the flow chart of the "Generation of degraded patterns" corresponding to Action 203, where each of the previously described Actions is illustrated. Accordingly, the generating in Action 203 comprises: a) obtaining the first synthetic set of values making up the pattern comprising a synthetic set of values indicative of a degraded performance of the cell 130, as described in Action 701; b) obtaining the first plurality of synthetic sets of values by shifting the starting point of the first synthetic set of values indicative of a degraded performance of the cell 130 in each synthetic set of values of the first plurality of synthetic sets of values, as described in Action 702; c) obtaining the second plurality of synthetic sets of values by applying the amplitude and sign to each of the first plurality of synthetic sets of values, as described in Action 704; and d) adding the second set of values to each synthetic set of values of the second plurality of synthetic sets of values to obtain the plurality of sets of values, as described in Action 705. In some embodiments, applying the amplitude and sign comprises truncating any values in the second plurality of synthetic sets of values exceeding the second threshold, the out-of-range values, which may be corrected.

As described earlier, in some embodiments, the generating 203 further comprises selecting the subset of the first plurality of synthetic sets of values based on the operation mode of the first network node, the operation mode being one of online and offline, as described in Action 703; wherein the second plurality of synthetic sets of values is obtained by applying the amplitude and sign to each synthetic set of values of the subset of the first plurality of synthetic sets of value.

Figure 9:
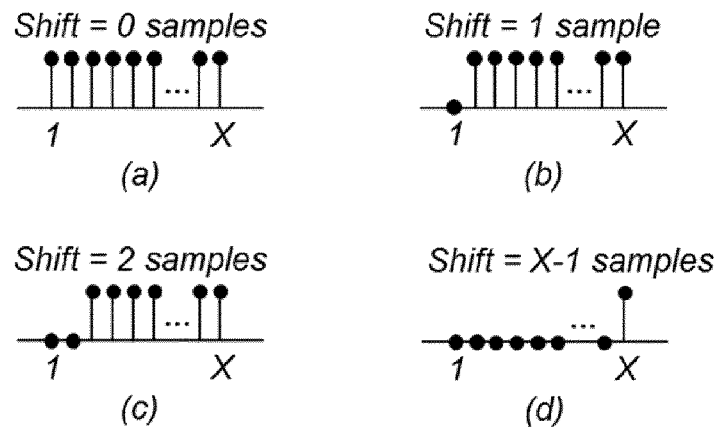
FIG. 9 is a schematic diagram depicting an example of shifted synthetic patterns of the "step" pattern, according to embodiments herein.

With regards to the obtaining of the first plurality of synthetic sets of values, the procedure of Action 702 may be as follows: the samples may be shifted to the right by one position, and a 'zero' sample, that is, a sample whose amplitude is zero, may be added to the leftmost position. This action may be repeated until the rightmost sample of the shifted synthetic pattern is the only nonzero sample. FIG. 9 shows an illustrative example of this procedure of Action 702 for the "step" pattern. For each first synthetic set of values, the number of shifted synthetic patterns may be X, as many as sampled time periods. FIG. 9(*a*) is a pattern with no variations. This particular pattern may not be considered in the method, since it may not represent any abnormal behavior. FIG. 9(*b*) is a pattern wherein one sample has been shifted. FIG. 9(*c*) is a pattern wherein two samples have been shifted. FIG. 9(*d*) is a pattern wherein X-samples have been shifted. The last shifted synthetic pattern of the first plurality of synthetic sets of values, see FIG. 9(*d*), is given by only one non-zero sample on the right. The same process may be applied to other first synthetic sets of values, i.e.: "impulse", "ramp" or "user-specific".

Figure 10:
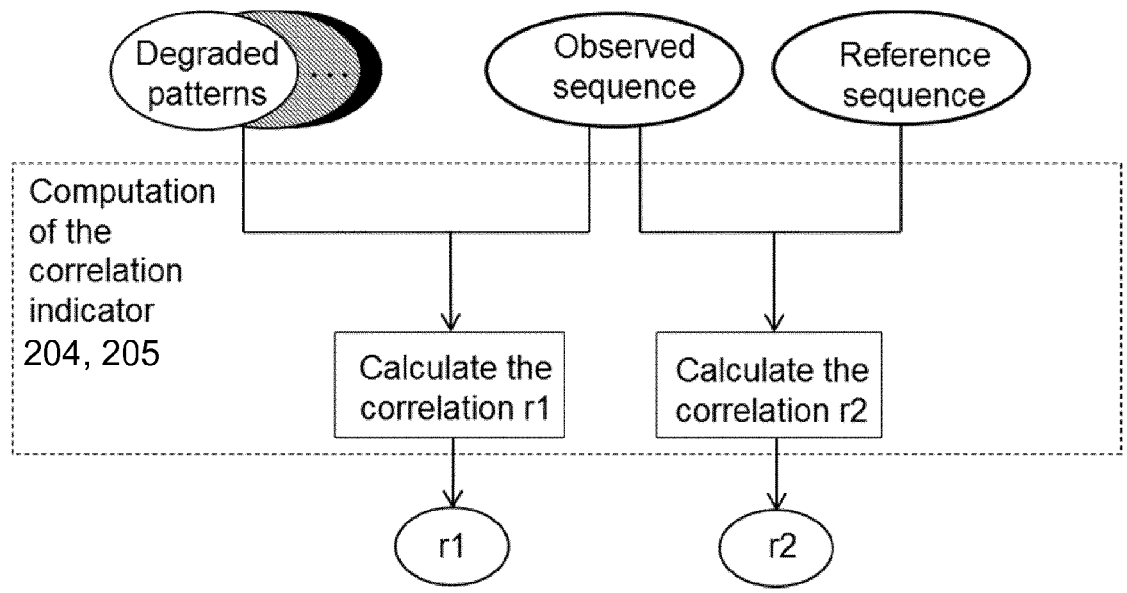
FIG. 10 is a flowchart depicting embodiments of a method in a first network node, according to embodiments herein for the computation of the correlation indicator.

FIG. 10 is a schematic block diagram illustrating the embodiments of the computation of the correlation indicator, corresponding to Actions 204 and 205 in this case, wherein two different values of the correlation indicator for each plurality of sets of values may be computed by the algorithm. In one case, r1 is the correlation between one degraded pattern of the plurality of sets of values and the obtained first set of values, represented as observed sequence, while, in the other case, r2 is the correlation between the obtained first set of values and the obtained second set of values, represented as the reference sequence.

Figure 11:
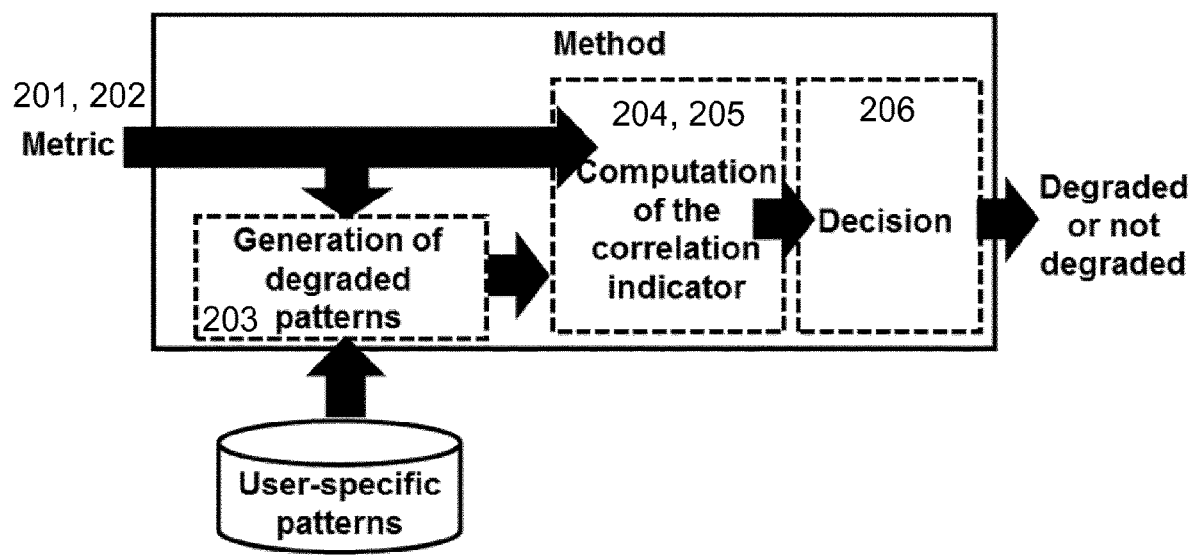
FIG. 11 is a flowchart depicting embodiments of a method in a first network node, according to embodiments herein.

To summarize, embodiments are described herein of a method for detecting cell degradations in the wireless communications network 100 through the use of correlation mechanisms. Such correlation mechanisms may be based on temporal analysis of sequences of data with the aim of finding similarities between them. More specifically, a potential degradation in a metric may be compared with a pre-generated degraded pattern in order to find similar behavior. FIG. 11 depicts a high-level block diagram of embodiments herein, showing its input and output signals. The first input signal for the method performed by the first network node 110 is the first set of values indicative of the performance of the cell 130 that is to be evaluated for possible degradation, as obtained by the first network node 110 in Action 201. This is indicated in FIG. 11 by the word "Metric". As stated earlier, in some embodiments, the first input signal for the method performed by the first network node 110 may be a vector comprising two parts: a) the first set of values and b) the second set of values indicative of a non-degraded performance of the cell 130, as obtained by the first network node 110 in Action 202. As observed in FIG. 11, the second input signal of the method is the set of user-specific synthetic patterns. From both input signals, the first network node may perform the Generation of degraded patters, as described before in Action 203. Next, the first network node 110 may perform the Computation of the correlation indicator, which may be r1, as described in Action 204 and r2, as described in Action 205. Finally, the Decision is performed by the first network node 110, as described in Action 206. The output signal of the first network node 110 is therefore if the cell 130 is degraded or not.

Proof of Concept

To illustrate the embodiments described herein, some non-limiting examples with real metric data are presented below. In these examples, k=4 and q=3 are assumed. In addition, the number of time periods, X, is 24, while the time period for one measurement, Y, is hour. Another assumption is that the method is used in offline mode only. Thus, the objective is to find degradations in historical data. For simplicity, one first synthetic set of values is considered, corresponding to the impulse pattern, shown in FIG. 5(a).

Example 1

Figure 12:
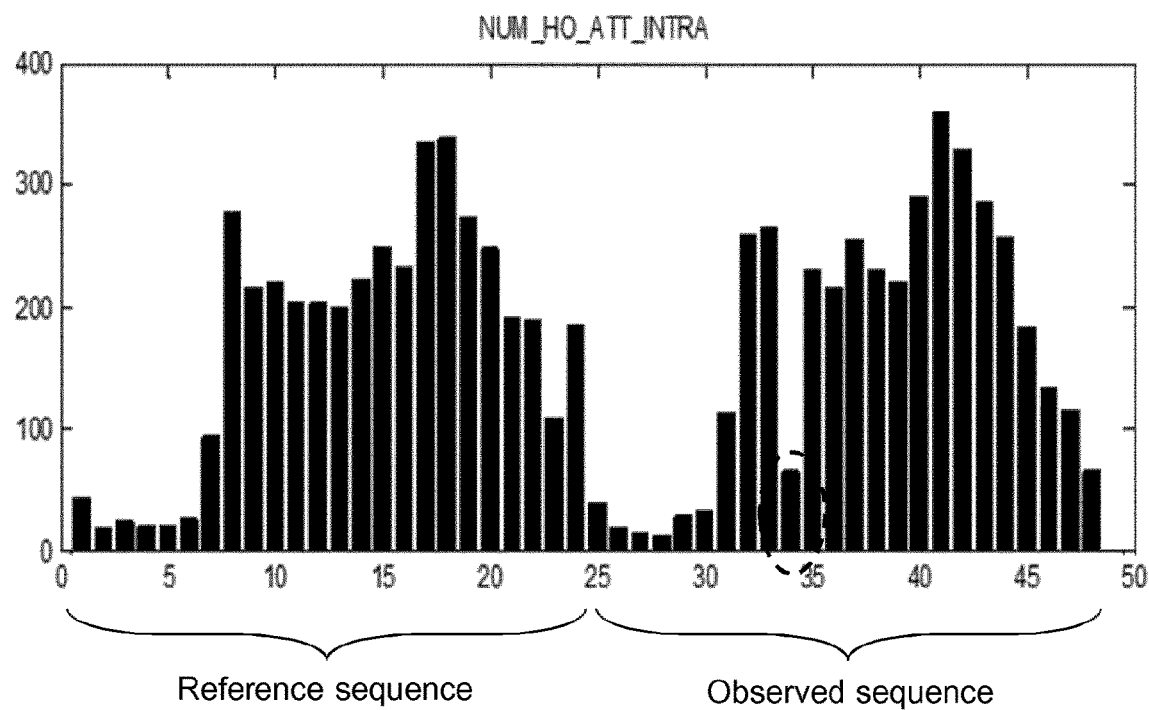
FIG. 12 is a schematic diagram depicting two-days data of the metric NUM_HO_ATT_INTRA.

The data used for this example, shown in FIG. 12, correspond to the metric NUM_HO_ATT_INTRA, that is, the number of intra-handover attempts. In the graphical representation of FIG. 12, the horizontal axis is the number of time periods sampled in time units, and the vertical axis is a count of the sampled metric, that is, the number of times that it occurs. The newest 24-hours data may be considered to be the obtained first set of values, represented as observed sequence, and the oldest 24-hours data to be the obtained second set of values, represented as reference sequence. As may be observed, the metric is degraded during hour, which is indicated in the Figure by a dashed circle.

Following the scheme illustrated in FIG. 11, the next action corresponds to the block "Generation of degraded patterns", where the mentioned first synthetic set of values, i.e., the impulse pattern, is shifted producing the first plurality of synthetic sets of values. As in this case the method works in the offline mode, late degradations must be included in the analysis, so that all the shifted synthetic patterns in the first plurality of synthetic sets of values are selected for the next stage.

The amplitude of the shifted synthetic patterns is given by k·σ. In this case, k=4 and σ=12.63. As a consequence, k·σ is equal to 450.54. The sign of the synthetic patterns for this particular metric may be positive and negative, so that the number of synthetic patterns in the second plurality of synthetic sets of values needs to be duplicated: one set is for positive sign and the other is for negative sign. The reason for this is that both relatively high and low values of the number of handovers may be considered as potential degradation.

The last part of the "Generation of degraded patterns" block is the obtaining of the the plurality of sets of values by aggregation, i.e., the arithmetic operation of summing, of the obtained synthetic patterns in the second plurality of synthetic sets of values to the obtained second set of values in order to generate such degraded patterns in the plurality of sets of values. The degraded patterns calculated from the synthetic templates with negative sign exceed the allowed range of the metric, since the achieved values are below zero and the number of handovers must always be greater than or equal to zero. Thus, those out-of-range samples are set to zero.

Figure 13:
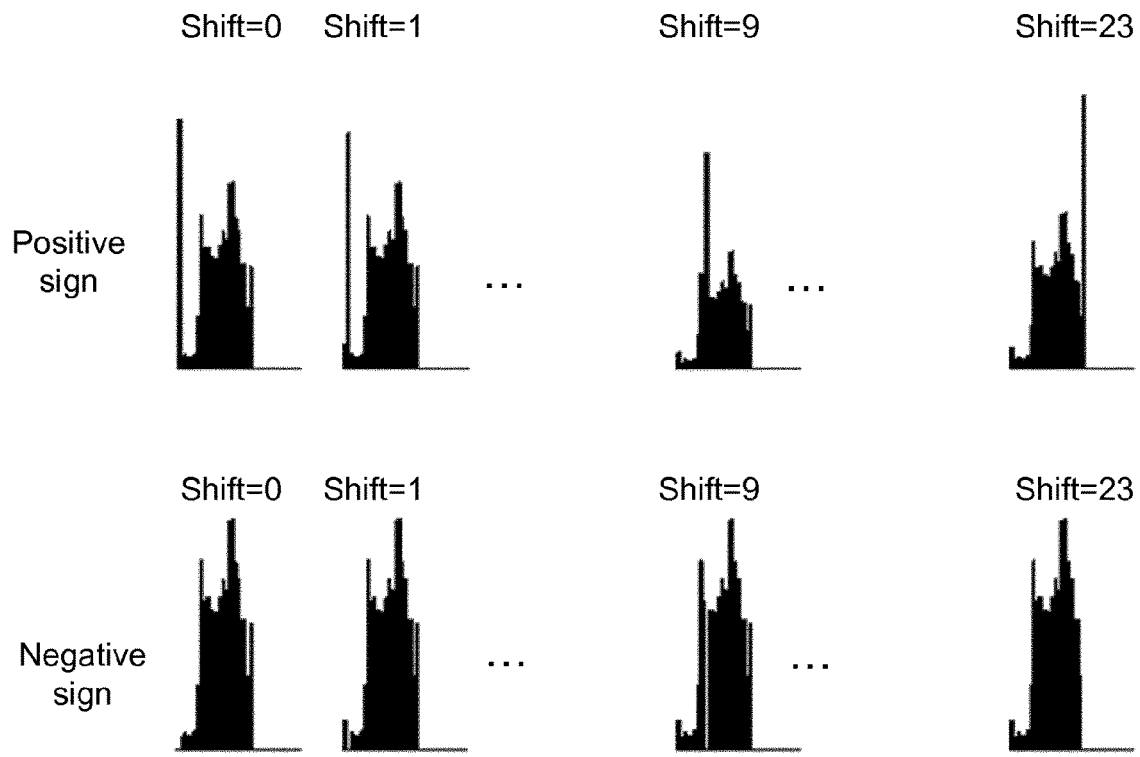
FIG. 13 is a schematic diagram depicting degraded patterns for example, according to embodiments herein.

FIG. 13 represents the output of this block, given by the set of degraded patterns in the plurality of sets of values. For better readability, not all the elements are shown. In each graphical representation of FIG. 13, the horizontal axis is the number of time periods sampled in time units, and the vertical axis is a count of the sampled metric, that is, the number of times that it occurs in the synthetic pattern, shifted as indicated.

Following the scheme illustrated in FIG. 11, the next action corresponds to the "Computation of the correlation indicator", corresponding to Actions 204 and 205. The magnitude of the Pearson coefficient is used in this example. In Table 1, the calculated values of r1 for each degraded pattern in the plurality of sets of values are shown. The value of r2 is equal to 90%. As observed, due to the strong influence of the traffic pattern in the metric, r2 is high. The remaining part, 10%, is the margin to detect degradations through the use of degraded patterns. The greatest value in Table 1 is 94%, indicated in bold. This value corresponds to the synthetic pattern in the plurality of sets of values with a shift of 9 samples and negative sign. This pattern has great possibilities to be the one that indicates degradation in the observed sequence.

TABLE 1

The values of r1 for each degraded pattern in example 1.

| $r_1$ [%] | Shift | | | | | | | | | | | | | | | | | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Sign + | 63 | 63 | 62 | 62 | 64 | 64 | 69 | 74 | 78 | 55 | 75 | 74 | 78 | 74 | 71 | 80 | 81 | 77 | 77 | 75 | 71 | 65 | 68 | 57 |
| Sign − | 90 | 90 | 90 | 90 | 90 | 90 | 88 | 78 | 78 | 94 | 81 | 82 | 79 | 81 | 82 | 76 | 66 | 70 | 75 | 78 | 84 | 88 | 88 | 92 |

Finally, the "Decision" block establishes whether the observed sequence is degraded or not. To make the decision, the value of d is calculated, see Table 2. Then, the first threshold th is calculated according to the equation th=(100−r2)/q, where q=3 and r2=90%. Thus, th=3.3%. In Table 3, the result after comparing the value of d with the first threshold th is represented, where 'Y' indicates degradation and 'N' indicates no degradation.

TABLE 2

The values of d for each degraded pattern in example 1.

| d [%] | Shift | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| Sign + | −27 | −27 | −28 | −28 | −26 | −26 | −21 | −16 | −12 | −35 | −15 | −16 | −12 |
| Sign − | 0 | 0 | 0 | 0 | 0 | 0 | −2 | −12 | −12 | 4 | −9 | −8 | −11 |

TABLE 2-continued

The values of d for each degraded pattern in example 1.

| d [%] | Shift | | | | | | | | | | |
|---|---|---|---|---|---|---|---|---|---|---|---|
| | 13 | 14 | 15 | 16 | 17 | 18 | 19 | 20 | 21 | 22 | 23 |
| Sign + | −16 | −19 | −10 | −9 | −13 | −13 | −15 | −19 | −25 | −22 | −33 |
| Sign − | −9 | −8 | −14 | −24 | −20 | −15 | −12 | −6 | −2 | −2 | 2 |

TABLE 3

The decision of the method in example 1.

| Y/N | Shift | | | | | | | | | | | | | | | | | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Sign + | N | N | N | N | N | N | N | N | N | N | N | N | N | N | N | N | N | N | N | N | N | N | N | N |
| Sign − | N | N | N | N | N | N | N | N | N | Y | N | N | N | N | N | N | N | N | N | N | N | N | N | N |

As observed, the decision of the method is that the metric is degraded. More specifically, the type of degradation is an impulse or "peak" and it corresponds to sample 10 of the observed sequence in the obtained first set of values.

An analysis will now be made about the existing mechanisms of cell degradation detection whether they are capable or not of detecting the degradation of example 1.

One alternative may be the use of traditional thresholds to detect abnormal values. In example 1, the degraded sample is within the range of normal values. Thus, it may not be possible to detect such an anomaly. Another approach would be the use of differential techniques. For example, the samples of the metric may be compared to the previous one. If the difference is greater than a threshold, the metric may be considered to be degraded. This threshold may be seen as the maximum change allowed between consecutive samples. In some cases, this approach may provide good results. However, this solution may not be applied in example 1. As shown in FIG. 12, the difference with respect to the previous sample is, in the case of sample 10, equal to −201. There are similar variations, or steps, to the degradation produced in sample 10 of the observed sequence in the obtained first set of values. In particular, its magnitude is similar to the variation corresponding to the sample 8 of the reference sequence in the obtained second set of values. In that case, the difference is 81, which is very close to the previous one, i.e., 201. This problem may be partially mitigated if the trend of the metric along time is considered. For example, in the morning, the traffic may be expected to be growing, so that a strong increase of traffic may not be an abnormal behavior. However, this kind of information is dependent of the metric and context factors, so that it may be avoided as far as possible.

Example 2

Figure 14:
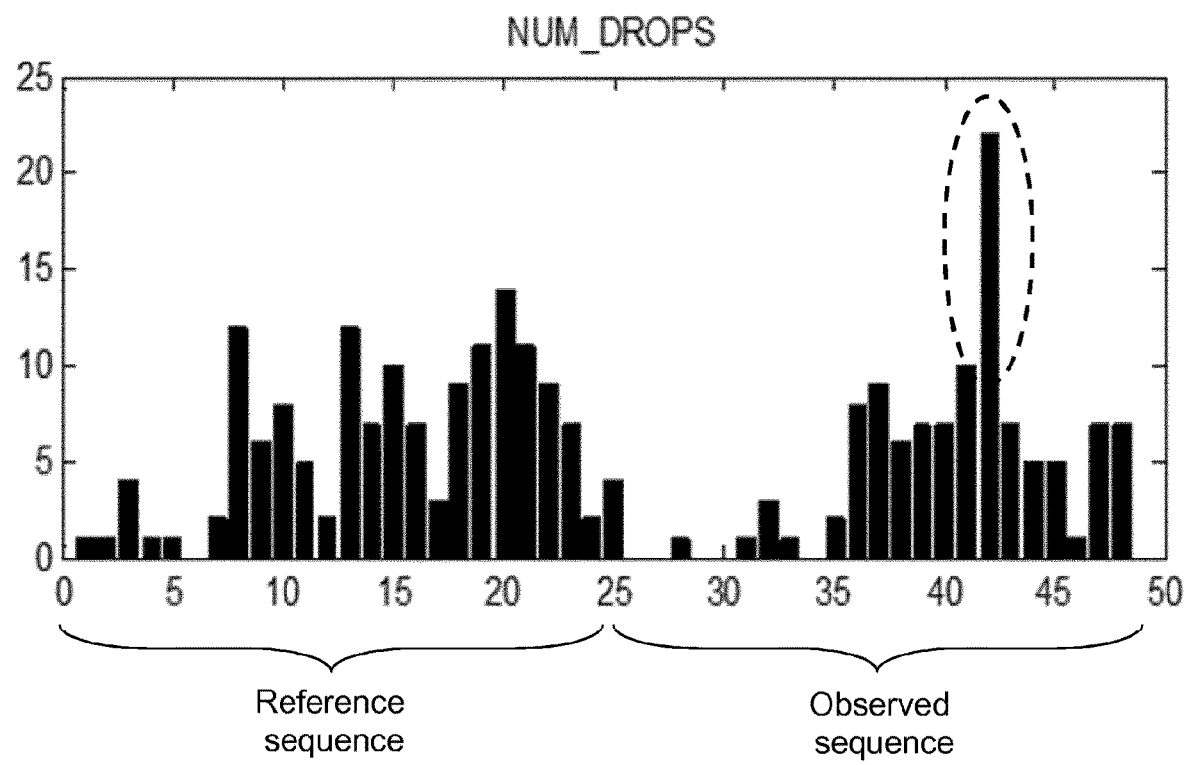
FIG. 14 is a schematic diagram depicting two-days data of the metric NUM_DROPS.

The data used in this example is represented in FIG. 14. The analyzed metric is NUM_DROPS, that is, the number of dropped calls. In the graphical representation of FIG. 14, the horizontal axis is the number of time periods sampled in time units, and the vertical axis is a count of the sampled metric, that is, the number of times that it occurs. As observed, the variance in time is relatively high due to the low number of occurrences per unit time even during the daytime, number of occurrences ~5. Thus, unlike example 1, it is expected that the obtained first set of values and obtained second set of values are poorly correlated, i.e., r2 low. The sample 8 of the observed sequence in the obtained first set of values, indicated by the dashed circle, may be considered as degradation, as it is clearly above the rest of samples.

Figure 15:
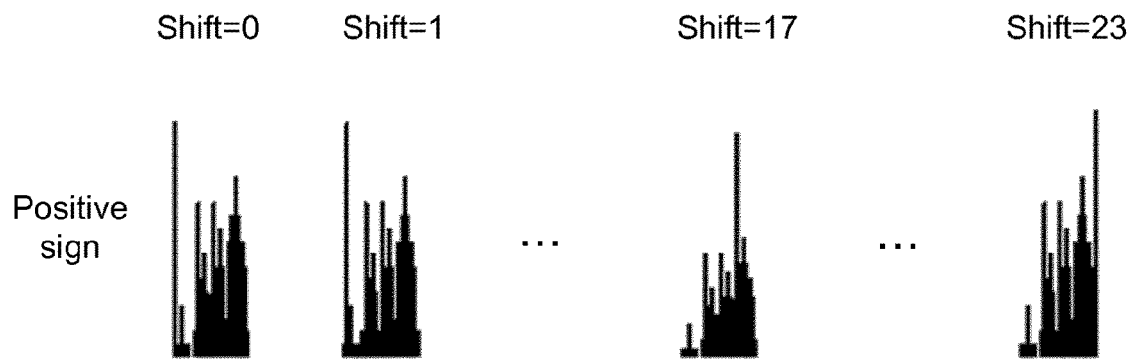
FIG. 15 is a schematic diagram depicting degraded patterns for example, according to embodiments herein.

Following the scheme illustrated in FIG. 11, in the "Generation of degraded patterns" block, the calculated standard deviation a of the reference sequence is 4.30. Hence, the amplitude of the shifted synthetic patterns in first plurality of synthetic sets of values is 17.20. The sign of the synthetic patterns for this particular metric is always positive, as a decrease of dropped calls, i.e. negative sign of the synthetic patterns, is not considered as degradation. In addition, corrections of out-of-range samples are not needed, since this metric ranges from 0 to +Inf. In FIG. 15, the set of degraded patterns is depicted. In each graphical representation of FIG. 15, the horizontal axis is the number of time periods sampled in time units, and the vertical axis is a count of the sampled metric, that is, the number of times that it occurs in the synthetic pattern, shifted as indicated.

Table 4 shows the calculated values of r1 for each degraded pattern in the plurality of sets of values. The value of r2 is, in this example, equal to 33%. As observed, the synthetic pattern in the plurality of sets of values with a shift of 17 is clearly above the others.

TABLE 4

The values of r1 for each degraded pattern in example 2.

| r₁ [%] | Shift | | | | | | | | | | | | | | | | | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Sign + | 28 | 15 | 14 | 18 | 15 | 16 | 18 | 19 | 16 | 12 | 19 | 39 | 33 | 29 | 29 | 31 | 44 | 68 | 29 | 23 | 24 | 15 | 31 | 36 |

In Table 5, the value of d is represented. In this example, the first threshold th is equal to 22.3%. The result of the comparison with this first threshold is shown in Table 6.

TABLE 5

The values of d for each degraded pattern in example 2.

| | Shift | | | | | | | | | | | | |
|---|---|---|---|---|---|---|---|---|---|---|---|---|---|
| d [%] | 0 | 1 | 2 | 3 | 4 | 5 | 6 | 7 | 8 | 9 | 10 | 11 | 12 |
| Sign + | −5 | −18 | −19 | −15 | −18 | −17 | −15 | −14 | −17 | −21 | −14 | 6 | 0 |
| | Shift | | | | | | | | | | | | |
| d [%] | 13 | 14 | 15 | 16 | 17 | 18 | 19 | 20 | 21 | 22 | 23 | | |
| Sign + | −4 | −4 | −2 | 11 | 35 | −4 | −10 | −9 | −18 | −2 | 3 | | |

TABLE 6

The decision of the method in example 2.

| | Shift | | | | | | | | | | | | | | | | | | | | | | | |
|---|---|---|---|---|---|---|---|---|---|---|---|---|---|---|---|---|---|---|---|---|---|---|---|---|
| Y/N | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Sign + | N | N | N | N | N | N | N | N | N | N | N | N | N | N | N | N | N | Y | N | N | N | N | N | N |

As expected, the output of the method is that the metric is degraded. In particular, the observed sequence in the obtained first set of values experiences a high peak in sample 8.

This example may be tackled by implementing simpler techniques, such as the use of traditional fixed thresholds. However, the objective of example 2 is to show the robustness of the proposed method to the variability of the metric. The first threshold th has been adapted to the variability of the metric as a function of r2, which measures the similarity between the observed and reference sequences. If a fixed threshold had been selected for d in examples 1 and 2, the method may have erroneously detected more number of degraded patterns. Thus, the adaptive threshold of the proposed approach may effectively cope with this issue.

To summarize the description provided above, embodiments herein may be understood to provide for an automatic correlation-based cell degradation detection.

Embodiments herein bring some important ideas to detect degradations in a metric of the cell 130, in particular: a) The use of correlation with synthetic patterns to find specific degradation patterns; b) The use of a set of shifted synthetic patterns to detect degradations depending on whether the system is used in online/offline mode; c) The concept of comparing the observed sequence with degraded patterns instead of normal patterns. Thus, the first network node 110 may search for similarities between sequences, instead of searching for dissimilarities; d) The use of relative, that is differential, correlation values and a dynamic threshold to avoid the effect of variability in metrics; e) The specific application to metrics in the field of mobile networks, e.g., the selection of 24-hours sequences of data, the standard degradation patterns, etc. . . .

The main advantages of embodiments herein are described below.

The first advantage is a reduced ratio of false positives: the comparison with pre-generated degraded patterns makes the detection algorithm much more effective than other existing correlation-based mechanisms.

A further advantage is flexibility to detect any anomalous pattern: the proposed method is able to find specific anomalous trends by using simple pre-defined templates.

A further advantage is improved proactivity for fault detection mechanisms: the proposed method usually acts in advance of future faulty situations, making the network more available and reliable and leading to cost savings.

A further advantage is low computational cost: the detection of degraded patterns is made through the calculation of a simple correlation indicator, e.g., the Pearson correlation coefficient, whose computational load is low.

A further advantage is ease of use: the proposed algorithm may require minimal configuration of parameters such thresholds, since they are not context-specific, i.e. related thresholds are independent of the metric.

A further advantage is robustness: unlike other approaches, the computation of a correlation indicator to search for similarities between two degraded patterns is very robust to variations in the metrics.

A further advantage is scalability: although the proposed algorithm is mainly intended to detect degraded patterns in metrics at the cell-level, metrics collected at the user-level, or at the network-level, may also be used as input for the algorithm.

To perform the method actions described above in relation to FIGS. 2-16, the first network node 110 is configured to determine whether a performance of a cell 130 associated with a second network node 120 is degraded or not. The first network node 110 comprises the following arrangement depicted in FIG. 16. As stated earlier, the first network node 110 and the second network node 120 are configured to operate in the wireless communications network 100.

The detailed description of some of the following corresponds to the same references provided above, in relation to the actions described for the first network node 110, and will thus not be repeated here.

The first network node 110 is configured, e.g., by means of an obtaining module 1601, to obtain the first set of values making up a pattern comprising a set of values indicative of the performance of the cell 130. The obtaining module 1601 may be accomplished by a processor 1604 of the first network node 110, in cooperation with a receiving port 1605 configured to receive information messages from other node/s, and in cooperation with a memory 1606 configured to store data, e.g., in the form of computer readable instructions, to be executed by the processor 1604, so as to execute any of the described embodiments. Any of the receiving port 1605 and the memory 1606 may be a module or a device, and are described later.

The first network node 110 may be further configured to, e.g. by means of the obtaining module 1601, obtain the second set of values indicative of the non-degraded performance of the cell 130.

In some embodiments, the first set of values and the second set of values are configured to be obtained in an operation mode out of: the offline mode and the online mode.

The first network node 110 is further configured to, e.g. by means of a determining module 1602, determine the first correlation between the obtained first set of values and the generated set of values, the generated set of values being indicative of the degraded performance of the cell 130. The determining module 1602 may work in cooperation with the obtaining module 1601 and, preferably, also in cooperation with the discarding module 702. The determining module 1602 may be accomplished by the processor 1604 of the first network node 110, in cooperation with the memory 1606 configured to store data, e.g., in the form of computer readable instructions, to be executed by the processor 1604, so as to execute any of the described embodiments, and also in cooperation with the sending port 1605, configured to send information messages to other node/s. As stated earlier, any of the receiving port 1605 and the memory 1606 may be a module or a device.

The first network node 110 is further configured to, e.g. by means of the determining module 1602, determine whether the performance of the cell 130 is degraded or not based on the determined first correlation, with respect to the first threshold.

The first network node 110 may be further configured to, e.g. by means of the determining module 1602, determine the second correlation between the obtained first set of values and the obtained second set of values.

In some embodiments, to determine whether the performance of the cell 130 is degraded or not is further configured to be based on the determined second correlation, with respect to the first threshold.

In some embodiments, to determine whether the performance of the cell 130 is degraded or not is configured to be based on the difference between the determined first correlation and the determined second correlation with respect to the first threshold.

The first network node 110 may be further configured to, e.g., by means of a generating module 1603, generate the plurality of sets of values, each of the plurality of generated sets of values making up a pattern comprising a set of values indicative of a degraded performance of the cell 130, wherein to generate comprises to:

obtain a first synthetic set of values making up a pattern comprising a synthetic set of values indicative of a degraded performance of the cell 130, obtain a first plurality of synthetic sets of values by shifting a starting point of the first synthetic set of values indicative of a degraded performance of the cell 130 in each synthetic set of values of the first plurality of synthetic sets of values, obtain a second plurality of synthetic sets of values by applying an amplitude and sign to each of the first plurality of synthetic sets of values, and add the second set of values to each synthetic set of values of the second plurality of synthetic sets of values to obtain the plurality of sets of values. The generating module 1603 may work in cooperation with the obtaining module 1601 and, preferably, also in cooperation with the determining module 1602. The generating module 1603 may be accomplished by the processor 1604 of the first network node 110, in cooperation with the memory 1606 configured to store data, e.g., in the form of computer readable instructions, to be executed by the processor 1604, so as to execute any of the described embodiments, and also in cooperation with the sending port 1605, configured to send information messages to other node/s. As stated earlier, any of the receiving port 1605 and the memory 1606 may be a module or a device.

In some embodiments, to apply the amplitude and sign comprises to truncate any values in the second plurality of synthetic sets of values exceeding the second threshold.

In some embodiments, to generate further comprises:

to select a subset of the first plurality of synthetic sets of values based on an operation mode of the first network node 110, the operation mode being one of online and offline, and wherein the second plurality of synthetic sets of values is configured to be obtained by applying the amplitude and sign to each synthetic set of values of the subset of the first plurality of synthetic sets of values.

In some embodiments, the generated set of values indicative of the degraded performance of the cell 130 is configured to be based on measured values and synthetic values.

In some embodiments, to determine the first correlation comprises to determine a set of first correlations, each of the first correlations being a correlation between the obtained first set of values and each generated sets of values of a plurality of generated sets of values indicative of a degraded performance of the cell 130, the set of first correlations comprising the first correlation, and to determine whether the performance of the cell 130 is degraded or not is further configured to be based on the determined set of first correlations and the determined second correlation.

Figure 16:
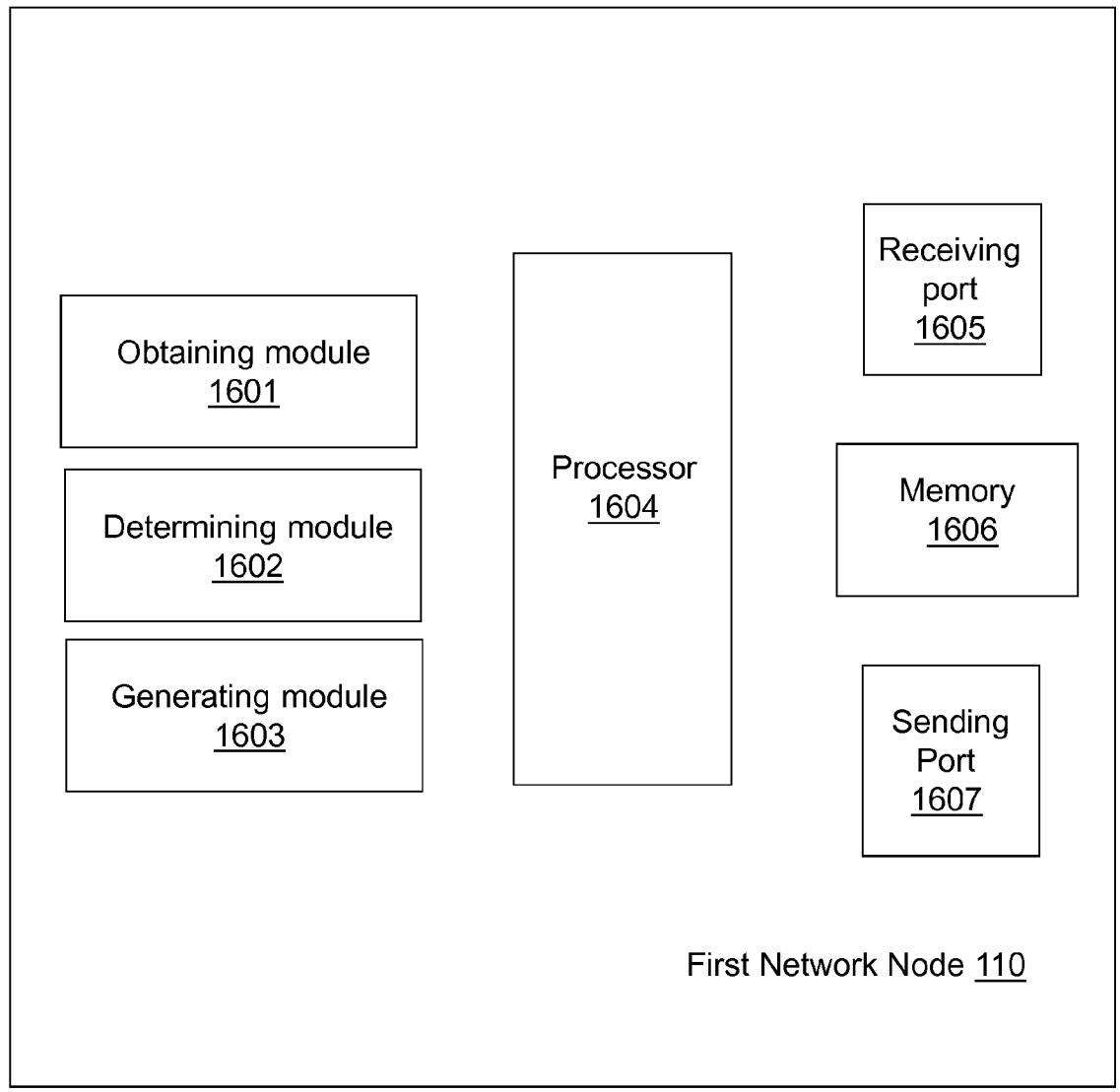
FIG. 16 is a schematic block diagram illustrating embodiments of a first network node, according to embodiments herein.

The embodiments herein to determine whether the performance of the cell 130 associated with the second network node 120 is degraded or not may be implemented through one or more processors, such as the processor 1604 in the first network node 110 depicted in FIG. 16, together with computer program code for performing the functions and actions of the embodiments herein. The program code mentioned above may also be provided as a computer program product, for instance in the form of a data carrier carrying computer program code for performing the embodiments herein when being loaded into the first network node 110. One such carrier may be in the form of a CD ROM disc. It may be however feasible with other data carriers such as a memory stick. The computer program code may furthermore be provided as pure program code on a server and downloaded to the first network node 110.

In some embodiments, information may be received from, e.g., the network database 150, or the second network node 120 through the receiving port 1605. In other embodiments, the first network node 110 may receive information from another structure in the wireless communications network 100 through the receiving port 1605. Since the receiving port 1605 may be in communication with the processor 1604, the receiving port 1605 may then send the received information to the processor 1604. The receiving port 1605 may also be configured to receive other information.

The first network node 110 may further comprise the memory 1606 comprising one or more memory units. The memory 1606 may be arranged to be used to store data in relation to applications to perform the methods herein when being executed in the first network node 110. The memory 1606 may be in communication with the processor 1604. Any of the other information processed by the processor 1604 may also be stored in the memory 1606.

The processor 1604 may be further configured to transmit or send information, such as a message to another network node to initiate the one or more actions, through a sending port 1607, which may be in communication with the processor 1604, and the memory 1606.

The information processed by the processor 1604 in relation to the embodiments of the method herein may be stored in the memory 1606 which, may be in communication with the processor 1604, as stated earlier, and with the communication ports, that is the receiving port 1605 and the sending port 1607.

Those skilled in the art will also appreciate that the different modules 1601-1603 described above may refer to a combination of analog and digital modules, and/or one or more processors configured with software and/or firmware, e.g., stored in memory, that, when executed by the one or more processors such as the processor 1604, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1601-1603 described above may be implemented as one or more applications running on one or more processors such as the processor 1604.

Thus, the methods according to the embodiments described herein for the first network node 110 may be respectively implemented by means of a computer program product, comprising instructions, i.e., software code portions, which, when executed on at least one processor, cause the at least one processor to carry out the actions described herein, as performed by the first network node 110. The computer program product may be stored on a computer-readable storage medium. The computer-readable storage medium, having stored thereon the computer program, may comprise instructions which, when executed on at least one processor, cause the at least one processor to carry out the actions described herein, as performed by the first network node 110. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The modules described may be for performing any of the pertinent embodiments described.

The embodiments herein are not limited to the above described preferred embodiments. Various alternatives, modifications and equivalents may be used. Therefore, the above embodiments should not be taken as limiting the scope of the invention.

REFERENCES

[1] Statistical Algorithms in Fault Detection and Prediction: Toward a Healthier Network, B. Cheung, G. Kumar and S. A. Rao, Bell Labs Technical Journal 9(4), 171-185, 2005
[2] Correlation-Based Cell Degradation Detection for Operational Fault Detection in Cellular Wireless Base-Stations, M. Zeeshan Asghar, R. Fehlmann and T. Ristaniemi, MONAMI 2013, LNICST 125, pp. 83-93, 2013
[3] Identifying fault category patterns in a communication network, R. Guerzoni, WO 2014040633 A1, March 2014
[4] System and method for root cause analysis of mobile network performance problems, J. Cao, L. Erran Li, T. Bu and S. Wu Sanders, WO 2013148785 A1, October 2013
[5] An Automatic Detection and Diagnosis Framework for Mobile Communication Systems, P. Szilágyi and S. Nováczki, IEEE Transactions on Network and Service Management, 9(2), 184-197, 2012.

The invention claimed is:

1. A method performed by a first network node for determining whether a performance of a cell associated with a second network node is degraded or not, the first network node and the second network node operating in a wireless communications network, the method comprising:
   obtaining a first set of values indicative of a performance of the cell, wherein the first set of values comprises an observed sequence of values of a performance indicator over a first time period,
   determining a first correlation between the obtained first set of values and a generated set of values, the generated set of values comprising a sequence of values of the performance indicator indicative of a degraded performance of the cell over a second time period, the second time period having the same length as the first time period, wherein the generated set of values are generated based on a previously measured reference set of values of the performance indicator indicative of a non-degraded performance of the cell and one or more synthetic patterns associated with a degraded performance of the cell, and
   determining whether the performance of the cell is degraded or not based on the determined first correlation, with respect to a first threshold.

2. The method of claim 1, further comprising:
   obtaining a second set of values indicative of a non-degraded performance of the cell, and
   determining a second correlation between the obtained first set of values and the obtained second set of values, wherein the determining whether the performance of the cell is degraded or not is further based on the determined second correlation, with respect to the first threshold.

3. The method of claim 2, wherein the determining whether the performance of the cell is degraded or not is based on a difference between the determined first correlation and the determined second correlation with respect to the first threshold.

4. The method of claim 2, wherein the first set of values and the second set of values are configured to be obtained in an operation mode out of: an offline mode and an online mode.

5. The method of claim 2, wherein the determining of the first correlation comprises determining a set of first correlations, each of the first correlations being a correlation between the obtained first set of values and each generated sets of values of a plurality of generated sets of values, each of the plurality of generated sets of values making up a pattern comprising a set of values indicative of a degraded performance of the cell, the set of first correlations comprising the first correlation, and wherein the determining of whether the performance of the cell is degraded or not is further based on the determined set of first correlations and the determined second correlation.

6. The method of claim 5, further comprising:
generating the plurality of sets of values indicative of a degraded performance of the cell, wherein the generating comprises:
obtaining a first synthetic set of values making up a pattern comprising a synthetic set of values indicative of a degraded performance of the cell,
obtaining a first plurality of synthetic sets of values by shifting a starting point of the first synthetic set of values indicative of a degraded performance of the cell in each synthetic set of values of the first plurality of synthetic sets of values,
obtaining a second plurality of synthetic sets of values by applying an amplitude and sign to each of the first plurality of synthetic sets of values, and
adding the second set of values to each synthetic set of values of the second plurality of synthetic sets of values to obtain the plurality of sets of values.

7. The method of claim 6, wherein applying the amplitude and sign comprises truncating any values in the second plurality of synthetic sets of values exceeding a second threshold.

8. The method of claim 6, wherein the generating further comprises:
selecting a subset of the first plurality of synthetic sets of values based on an operation mode of the first network node, the operation mode being one of online and offline, and
wherein the second plurality of synthetic sets of values is obtained by applying the amplitude and sign to each synthetic set of values of the subset of the first plurality of synthetic sets of values.

9. A non-transitory computer-readable storage medium, having stored thereon a computer program, comprising instructions which, when executed on at least one processor, cause the at least one processor to carry out the method according to claim 1.

10. A first network node configured to determine whether a performance of a cell associated with a second network node is degraded or not, the first network node and the second network node being configured to operate in a wireless communications network, the first network node being further configured to:
obtain a first set of values indicative of a performance of the cell, wherein the first set of values comprises an observed sequence of values of a performance indicator over a first time period,
determine a first correlation between the obtained first set of values and a generated set of values, the generated set of values comprising a sequence of values of the performance indicator indicative of a degraded performance of the cell over a second time period, the second time period having the same length as the first time period, wherein the generated set of values are generated based on a previously measured reference set of values of the performance indicator indicative of a non-degraded performance of the cell and one or more synthetic patterns associated with a degraded performance of the cell, and
determine whether the performance of the cell is degraded or not based on the determined first correlation, with respect to a first threshold.

11. The first network node of claim 10, being further configured to:
obtain a second set of values indicative of a non-degraded performance of the cell, and
determine a second correlation between the obtained first set of values and the obtained second set of values,
wherein to determine whether the performance of the cell is degraded or not is further configured to be based on the determined second correlation, with respect to the first threshold.

12. The first network node of claim 11, wherein to determine whether the performance of the cell is degraded or not is configured to be based on a difference between the determined first correlation and the determined second correlation with respect to the first threshold.

13. The first network node of claim 11, wherein the first set of values and the second set of values are configured to be obtained in an operation mode out of: an offline mode and an online mode.

14. The first network node of claim 11, wherein to determine the first correlation comprises to determine a set of first correlations, each of the first correlations being a correlation between the obtained first set of values and each generated sets of values of a plurality of generated sets of values, each of the plurality of generated sets of values making up a pattern comprising a set of values indicative of a degraded performance of the cell, the set of first correlations comprising the first correlation, and wherein to determine whether the performance of the cell is degraded or not is further configured to be based on the determined set of first correlations and the determined second correlation.

15. The first network node of claim 14, further configured to:
generate the plurality of sets of values indicative of a degraded performance of the cell, wherein to generate comprises to:
obtain a first synthetic set of values making up a pattern comprising a synthetic set of values indicative of a degraded performance of the cell,
obtain a first plurality of synthetic sets of values by shifting a starting point of the first synthetic set of values indicative of a degraded performance of the cell in each synthetic set of values of the first plurality of synthetic sets of values,
obtain a second plurality of synthetic sets of values by applying an amplitude and sign to each of the first plurality of synthetic sets of values, and
add the second set of values to each synthetic set of values of the second plurality of synthetic sets of values to obtain the plurality of sets of values.

16. The first network node of claim 15, wherein to apply the amplitude and sign comprises to truncate any values in the second plurality of synthetic sets of values exceeding a second threshold.

17. The first network node of claim 15, wherein to generate further comprises:
to select a subset of the first plurality of synthetic sets of values based on an operation mode of the first network node, the operation mode being one of online and offline, and
wherein the second plurality of synthetic sets of values is configured to be obtained by applying the amplitude and sign to each synthetic set of values of the subset of the first plurality of synthetic sets of values.

* * * * *